(12) United States Patent
Nomura et al.

(10) Patent No.: US 9,963,048 B2
(45) Date of Patent: May 8, 2018

(54) SEAT SLIDE APPARATUS FOR VEHICLE (71) Applicant: AISIN SEIKI KABUSHIKI KAISHA, Kariya-shi (JP)

(72) Inventors: Keisuke Nomura, Toyokawa (JP); Tateki Kawamura, Inazawa (JP); Naoaki Hoshihara, Obu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days. days.

(21) Appl. No.: 15/463,556

(22) Filed: Mar. 20, 2017

(65) Prior Publication Data

US 2018/0022237 A1    Jan. 25, 2018

(30) Foreign Application Priority Data

Jul. 20, 2016 (JP) ................................. 2016-142823

(51) Int. Cl.
*F16M 13/00* (2006.01)
*B60N 2/07* (2006.01)
*F16C 29/06* (2006.01)

(52) U.S. Cl.
CPC ......... *B60N 2/0722* (2013.01); *B60N 2/0715* (2013.01); *F16C 29/0611* (2013.01); *F16C 29/0642* (2013.01); *F16C 2326/08* (2013.01)

(58) Field of Classification Search
USPC ....................................................... 248/430
See application file for complete search history.

(56) References Cited

U.S. PATENT DOCUMENTS

| 5,192,045 A | * | 3/1993 | Yamada | B60N 2/071 248/430 |
| 5,529,397 A | * | 6/1996 | Yoshida | B60N 2/071 248/430 |
| 5,676,341 A | * | 10/1997 | Tarusawa | B60N 2/0705 248/430 |
| 5,765,798 A | * | 6/1998 | Isomura | B60N 2/067 248/429 |

(Continued)

FOREIGN PATENT DOCUMENTS

| JP | 2012-71656 | 4/2012 |
| JP | 2015-3591 | 1/2015 |
| WO | WO2010/024210 | 3/2010 |

*Primary Examiner* — Monica E Millner
(74) *Attorney, Agent, or Firm* — Oblon, McClelland, Maier & Neustadt, L.L.P.

(57) ABSTRACT

A seat slide apparatus for a vehicle, the seat slide apparatus includes: a lower rail which is fixed to a vehicle floor; an upper rail which is slidably engaged with the lower rail; and a rolling element circulation unit having rolling elements and interposed between the lower rail and the upper rail in a state where the rolling elements are able to be circulated, in which the lower rail includes a bottom wall portion, sidewall portions, and upper wall portions, the upper rail includes a main body portion, and folded-back portions, the rolling element circulation unit includes a case having an annular accommodating path accommodating the rolling elements, between the lower rail and the upper rail, an upper rolling element circulation unit and a lower rolling element circulation unit are provided to be disposed at two positions spaced apart from each other, and the upper rail includes a pedestal portion.

6 Claims, 5 Drawing Sheets (56) References Cited

U.S. PATENT DOCUMENTS

| | | | | |
|---|---|---|---|---|
| 5,988,884 A * | 11/1999 | Scheib | ............... | B60N 2/0705 384/34 |
| 6,089,521 A * | 7/2000 | Tarusawa | ............ | B60N 2/0705 248/430 |
| 6,497,397 B2 * | 12/2002 | Fujimoto | ............... | B60N 2/071 248/430 |
| 6,688,574 B2 * | 2/2004 | Okazaki | ............... | B60N 2/0705 248/424 |
| 6,691,971 B2 * | 2/2004 | Yamada | ............... | B60N 2/0705 248/430 |
| 6,695,379 B1 * | 2/2004 | Ishida | ................... | B60N 2/002 180/273 |
| 6,772,985 B2 * | 8/2004 | Lee | ...................... | B60N 2/071 248/424 |
| 7,267,317 B2 * | 9/2007 | Kato | ..................... | B60N 2/062 248/429 |
| 8,066,314 B2 * | 11/2011 | Tamura | .................... | B60R 5/04 296/26.09 |
| 8,091,851 B2 | 1/2012 | Yamada et al. | | |
| 8,398,045 B2 * | 3/2013 | Kimura | ............... | B60N 2/0705 248/429 |
| 8,556,222 B2 * | 10/2013 | Yamada | ............... | B60N 2/0705 248/429 |
| 8,757,578 B2 * | 6/2014 | Kitamura | ............... | B60N 2/07 248/430 |
| 9,108,533 B2 * | 8/2015 | Suck | ..................... | B60N 2/072 |
| 9,126,505 B2 * | 9/2015 | Moriyama | ............... | B60N 2/01 |
| 9,327,615 B2 * | 5/2016 | Yamada | ............... | B60N 2/0705 |
| 9,327,616 B2 * | 5/2016 | Hoshihara | ............ | B60N 2/0856 |
| 9,517,707 B2 * | 12/2016 | Sasaki | ................. | B60N 2/0715 |
| 2007/0090263 A1 * | 4/2007 | Yamada | ............... | B60N 2/0705 248/429 |

* cited by examiner

FIG. 8

SEAT SLIDE APPARATUS FOR VEHICLE

CROSS REFERENCE TO RELATED APPLICATIONS

This application is based on and claims priority under 35 U.S.C. § 119 to Japanese Patent Application 2016-142823, filed on Jul. 20, 2016, the entire contents of which are incorporated herein by reference.

TECHNICAL FIELD

This disclosure relates to a seat slide apparatus for a vehicle which is provided with a rolling element circulation unit.

BACKGROUND DISCUSSION

In the related art, a seat slide apparatus for a vehicle includes lower rails which are fixed to a vehicle floor, and upper rails which are slidably engaged with the lower rails and support a seat at an upper side thereof. The seat slide apparatus enables the seat to be moved forward and rearward by sliding the upper rails relative to the lower rails.

For example, in a seat slide apparatus disclosed in WO 2010/024210A (Reference 1), a rolling element circulation unit is provided to be interposed between a lower rail and an upper rail. The rolling element circulation unit includes a case which defines an annular accommodating path, and a plurality of rolling elements which is accommodated in the annular accommodating path. In addition, in the rolling element circulation unit, each of the rolling elements is exposed through an opening formed in the case, and thus is in contact with an inner wall surface of the lower rail. Further, the rolling element circulation unit is configured such that when the upper rail slides relative to the lower rail, each of the rolling elements rolls in the annular accommodating path, and as a result, the upper rail may smoothly move forward and rearward.

In addition, for example, in a seat slide apparatus disclosed in JP 2015-003591A (Reference 2), an upper rail includes a pair of sidewall portions which face each other in a width direction, and an upper wall portion which connects the upper ends of the sidewall portions. In addition, the upper rail has a folded-back portion which is folded back outward in a rail width direction from the lower end of each of the sidewall portions, and extends upward. Further, the seat slide apparatus includes rolling elements retained between a tip end portion of each of the folded-back portions and an inner wall surface of a lower rail.

Typically, the rolling elements in the seat slide apparatus are interposed between the upper rail and the lower rail in a state in which each of the rolling elements is in contact with an outer surface of the upper rail formed by the folded-back portion and the inner wall surface of the lower rail at two positions spaced apart from each other in a vertical direction when viewed in a cross section orthogonal to a longitudinal direction of the lower rail and the upper rail. However, in the configuration, when a seat load applied to the seat is applied to the upper rail, the folded-back portion is warped inward with respect to the lower rolling elements acting as support points. Therefore, gaps may be formed between the rolling elements and the folded-back portion of the upper rail and between the rolling elements and the inner wall surface of the lower rail, and as a result, there is a concern that rattling occurs.

However, in the configuration of Reference 2, the folded-back portion is lifted upward with respect to the lower rolling elements acting as support points when a seat load is applied to the upper rail. That is, the folded-back portion of the upper rail presses the rolling elements retained at the tip end surface of the folded-back portion against the inner wall surface of the lower rail. Therefore, it is possible to suppress the problem concerning the gaps formed between the rolling elements and the inner well surface of the lower rail and between the rolling elements and the folded-back portion of the upper rail based on the seat load.

However, it is difficult to apply the configuration of the seat slide apparatus provided with the rolling element circulation unit that accommodates the plurality of rolling elements in the case as disclosed in Reference 1 to the configuration of the seat slide apparatus in which the rolling elements are retained at a tip end portion of the folded-back portion that extends upward as disclosed in Reference 2. For this reason, the problem concerning the gaps between the rolling elements and the folded-back portion of the upper rail and between the rolling elements and the inner wall surface of the lower rail may still occur in the configuration including the rolling element circulation unit, and as a result, there is a need for improvement.

Thus, a need exists for a seat slide apparatus for a vehicle which is not susceptible to the drawback mentioned above.

SUMMARY

It is preferable that a seat slide apparatus for a vehicle according to an aspect of this disclosure includes: a lower rail which is fixed to a vehicle floor; an upper rail which is slidably engaged with the lower rail; and a rolling element circulation unit having a plurality of rolling elements and interposed between the lower rail and the upper rail in a state where the plurality of rolling elements is able to be circulated, in which the lower rail includes a bottom wall portion which is fixed to the vehicle floor, sidewall portions which extend upward from opposite ends of the bottom wall portion in a width direction of the lower rail and the upper rail, and upper wall portions which are folded back inward in the width direction from the sidewall portions, the upper rail includes a main body portion which supports a seat for the vehicle at an upper side thereof, and folded-back portions which extend outward in the width direction from a lower end of the main body portion and extend upward to face the sidewall portions of the lower rail, the rolling element circulation unit includes a case having an annular accommodating path that accommodates the rolling elements, the rolling element circulation unit is configured such that when the case is fixed to the folded-back portion of the upper rail, the rolling elements, each of which is exposed to the outside of the case through an opening that are provided at the annular accommodating path, come into contact with an inner wall surface of the lower rail, between the lower rail and the upper rail, an upper rolling element circulation unit and a lower rolling element circulation unit are provided to be disposed at two positions spaced apart from each other in a vertical direction, the upper rail includes a pedestal portion that is provided at a tip end portion of the folded-back portion of the upper rail to extend in the width direction to face the upper wall portion of the lower rail, and the upper rolling element circulation unit is configured such that the rolling elements, which are exposed through the opening as the case is fixed to the pedestal portion, are in contact with the upper wall portion of the lower rail from the outside to the inside in the width direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment of a seat slide apparatus for a vehicle will be described with reference to the drawings.

Figure 1:
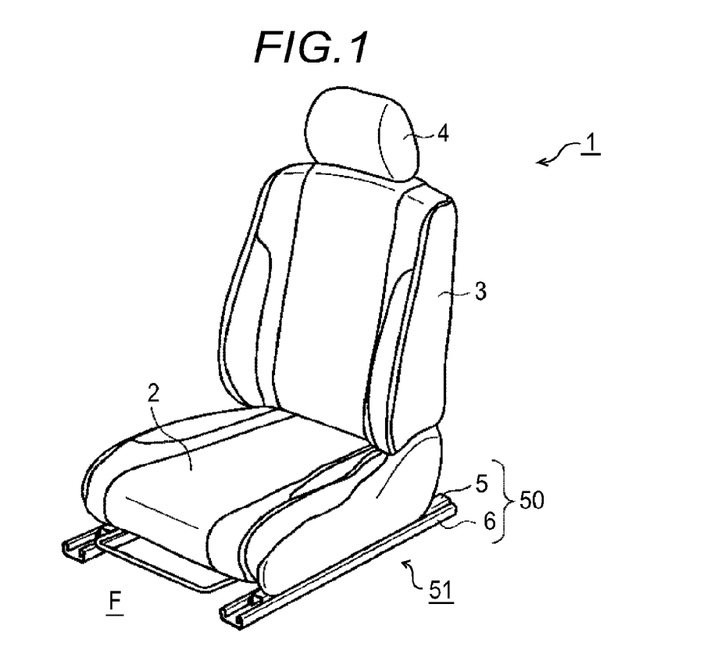
FIG. 1 is a perspective view of a seat.

As illustrated in FIG. 1, a seat 1 for a vehicle includes a seat cushion 2, and a seatback 3 installed to be tiltable with respect to the rear end portion of the seat cushion 2. Further, a headrest 4 is installed on the upper end of the seatback 3.

A pair of left and right lower rails 5 is provided on a floor F of the vehicle to extend in a front and rear direction of the vehicle. Further, upper rails 6 are mounted on the lower rails 6, respectively, to be engaged with the lower rails 5, respectively, and to be slidable on the lower rails 5 in a direction where the lower rails 5 extend. Further, in the present exemplary embodiment, the seat 1 is supported on the upper side of seat slide rails 50, each of which is formed by the lower and upper rails 5 and 6.

That is, in the present exemplary embodiment, the seat 1 is fixed to the upper rails 6 in a state of extending across the left and right seat slide rails 50. In addition, the upper rail 6 moves relative to the lower rail 5. In addition, the seat slide rail 50 is provided with a lock mechanism (not illustrated) that may restrict the relative movement of the upper rail 6 relative to the lower rail 5. Accordingly, a seat slide apparatus 51, which may restrict the forward and rearward movements of a position of the seat 1, is formed on the seat 1 in the present exemplary embodiment.

Figure 2:
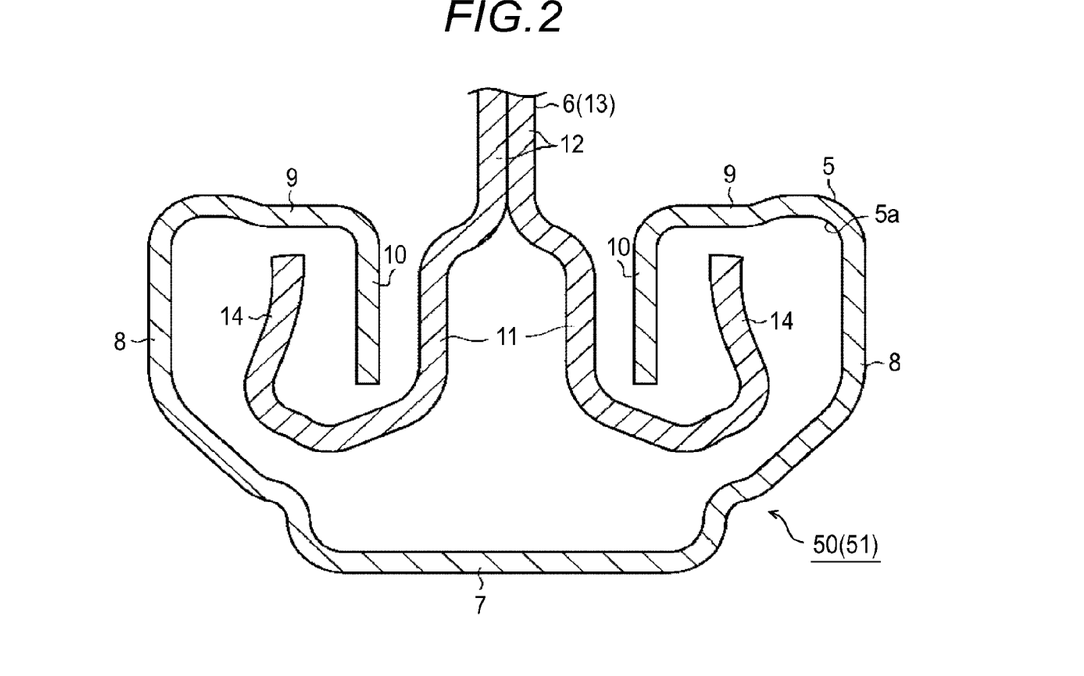
FIG. 2 is a cross-sectional view of a lower rail and an upper rail.

As illustrated in FIG. 2, the lower rail 5 includes a flat plate-shaped bottom wall portion 7 fixed to the floor F (see FIG. 1) of the vehicle. In addition, a pair of sidewall portions 8, which extends upward, stands at both ends of the bottom wall portion 7 in a width direction (left and right direction in FIG. 2), respectively. In addition, a flange-shaped upper wall portion 9, which is folded back inward and extends in a rail width direction which is a width direction of each of the upper and lower rails, is formed at an upper end (end portion at an upper side in FIG. 2) of each of the sidewall portions 8. Further, a vertical plate portion 10, which extends downward, is formed at a tip end of each of the upper wall portions 9.

Meanwhile, the upper rail 6 includes a pair of sidewall portions 11 which face each other in the width direction. In addition, the upper rail 6 includes a connecting portion 12 that connects the upper ends of the sidewall portions 11 to each other. In addition, in the present exemplary embodiment, the upper rail 6 is formed with a main body portion 13 having a substantially inverted V shaped cross section formed by the sidewall portions 11 and the connecting portion 12. That is, in the present exemplary embodiment, the seat 1 is configured to be supported at the upper side of the main body portion 13. Further, the main body portion 13 is mounted on the lower rail 5 such that the main body portion 13 is disposed between the sidewall portions 8 and the vertical plate portions 10 of the lower rail 5 side.

The upper rail 6 includes folded-back portions 14 which extend outward in the width direction from lower ends of the sidewall portions 11, respectively, and then are folded back to extend upward to face the sidewall portions 8 of the lower rail 5. Further, each of the folded-back portions 14 is disposed in a space surrounded by the sidewall portion 8, the upper wall portion 9, and the vertical plate portion 10 which constitute the lower rail 5, thereby restricting the relative movement in the upward and width directions relative to the lower rail 5.

Figure 3:
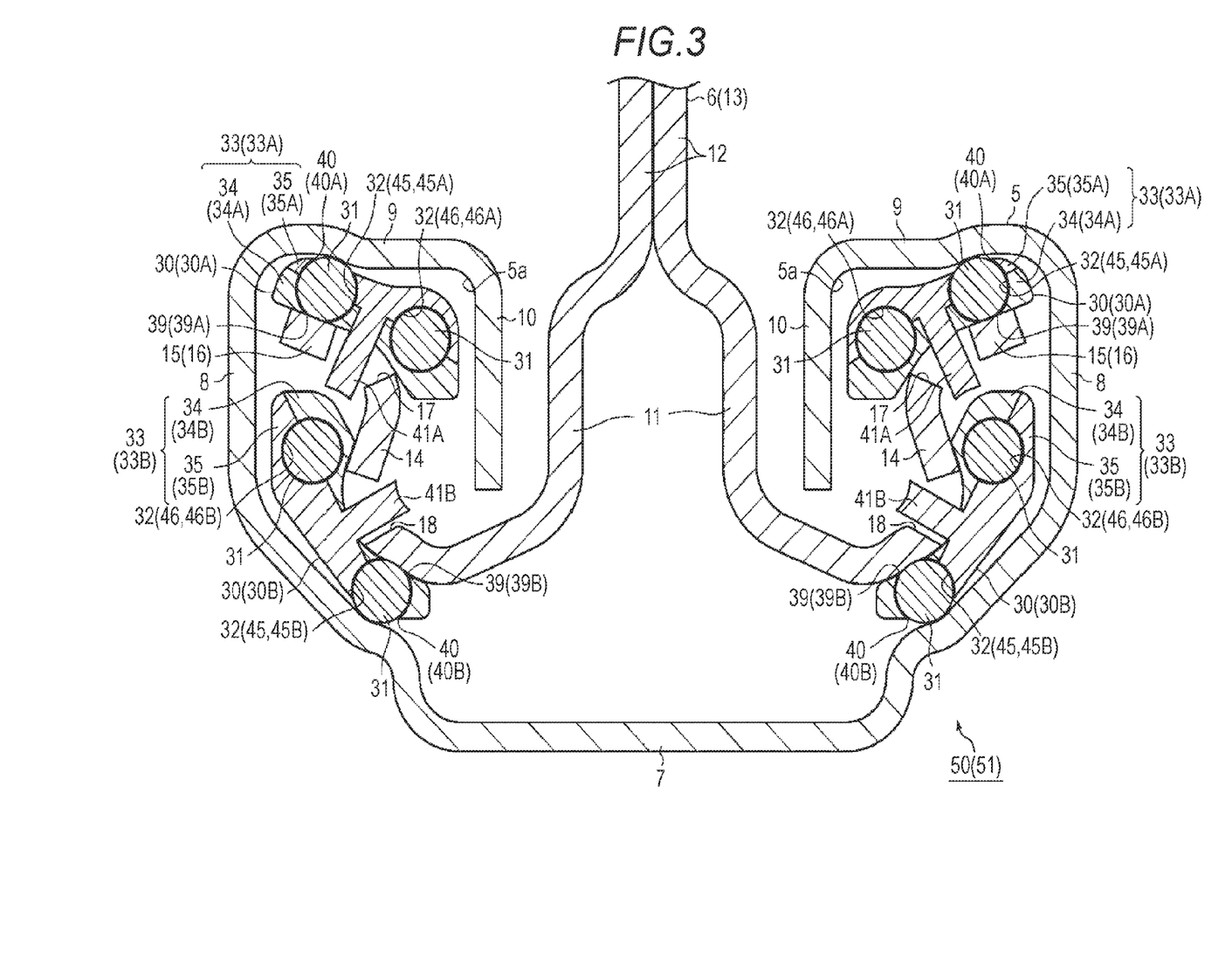
FIG. 3 is a cross-sectional view of the lower rail, the upper rail, and a rolling element circulation unit.
Figure 4:
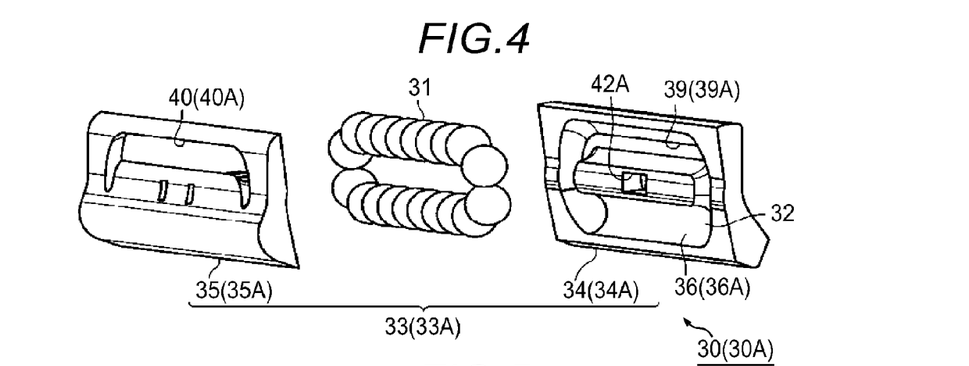
FIG. 4 is an exploded perspective view of an upper rolling element circulation unit.

As illustrated in FIG. 3, in the present exemplary embodiment, the seat slide apparatus 51 includes rolling element circulation units 30 (30A, 30B) which accommodate a plurality of rolling elements 31 between the inner wall surface 5a of the lower rail 5 and the folded-back portions 14 of the upper rail 6. Specifically, the seat slide apparatus 51 includes an upper rolling element circulation unit 30A and a lower rolling element circulation unit 30B which are disposed at two positions spaced apart from each other in a vertical direction. Further, in the seat slide apparatus 51 in the present exemplary embodiment, the rolling elements 31, which are accommodated in each of the rolling element circulation units 30, roll in a state of being in sliding contact with the inner wall surface 5a of the lower rail 5 and the folded-back portion 14 of the upper rail 6 such that the smooth relative movement of the upper rail 6 relative to the lower rail 5 is ensured.

As illustrated in FIGS. 4 to 7, in the present exemplary embodiment, each of the rolling element circulation units 30 (30A and 30B) has a case 33 (33A or 33B) having an annular accommodating path 32 in which each of the rolling elements 31 is accommodated to be circulated. Specifically, the case 33 is formed by assembling a base portion 34 (34A or 34B), which is fixed to the folded-back portion 14 of the upper rail 6, and a cover portion 35 (35A or 35B) which faces the inner wall surface 5a of the lower rail 5 (see FIG. 3). In addition, substantially elliptical and annular groove portions 36 (36A and 36B) and 37 (37A and 37B) are formed in the base portion 34 and the cover portion 35, respectively. Further, in the present exemplary embodiment, the case 33 is configured such that the annular accommodating path 32 is formed because the groove portions 36 (36A and 36B) and 37 (37A and 37B) face each other in a state where the base portion 34 and the cover portion 35 are assembled.

In addition, the case 33 has openings 39 and 40 which are provided at the annular accommodating path 32. Specifically, the base portion 34 and the cover portion 35, which constitute the case 33, are formed with the openings 39 (39A and 39B) and 40 (40A and 40B), respectively, at the positions that face each other in a state where the base portion 34 and the cover portion 35 are assembled. In addition, each of the openings 39 (39A and 39B) and 40 (40A and 40B) has an oblong hole shape extending in the longitudinal direction in a state where the case 33 is assembled to the folded-back portion 14 of the upper rail 6. Further, in the present exemplary embodiment, the rolling element circulation unit 30 (30A or 30B) is configured such that the rolling elements 31, which are exposed to the outside of the case 33 through the openings 39 (39A and 39B) and 40 (40A and 40B), respectively, roll in a state of being in sliding contact with the inner wall surface 5a of the lower rail 5 and the folded-back portion 14 of the upper rail 6.

Figure 8:
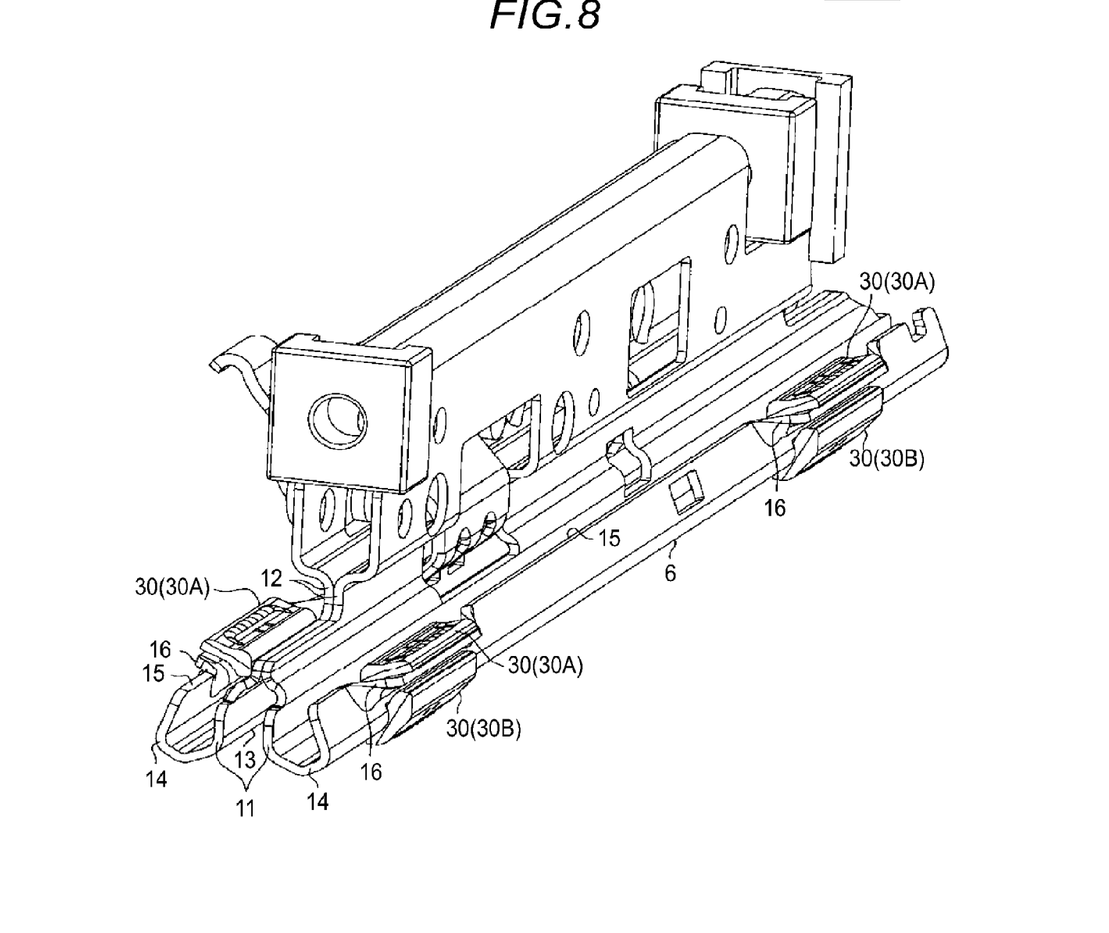
FIG. 8 is a perspective view of the upper rail.

Meanwhile, as illustrated in FIGS. 3 and 8, in the seat slide apparatus 51 in the present exemplary embodiment, the folded-back portion 14 of the upper rail 6 extends outward in the rail width direction from a lower end of the main body portion 13, and then further extends upward from the outside to the inside in the rail width direction in the state of facing the sidewall portion 8 of the lower rail 5. In addition, a pedestal portion 16, which has a bent shape extending from the inside to the outside in the rail width direction to face the upper wall portion 9 of the lower rail 5, is formed at a tip end portion 15 of the folded-back portion 14. Specifically, pedestal portions 16 are provided at two front and rear points that are spaced apart from each other in the longitudinal direction of the upper rail 6. Further, in the present exemplary embodiment, the seat slide apparatus 51 is configured such that the upper rolling element circulation unit 30A is fixed to the pedestal portion 16, and at a position below the pedestal portion 16, the lower rolling element circulation unit 30B is fixed to a lower portion of the folded-back portion 14.

In detail, as illustrated in FIG. 3, the upper rolling element circulation unit 30A is configured such that the base portion 34A, which constitutes the case 33A, is fixed to the pedestal portion 16. Thus, the opening 40A provided as a first opening in the cover portion 35A that constitutes the case 33A, faces the inner wall surface 5a of the lower rail 5. In addition, the upper rolling element circulation unit 30A is configured such that the opening 39A provided in the base portion 34A faces the pedestal portion 16. Therefore, the opening 39A provided as a second opening at the base portion 34A side is configured to serve as an upper rail side opening for exposing each of the rolling elements 31 accommodated in the annular accommodating path 32 to the outside of the case 33A, and bringing each of the rolling elements 31 into contact with the folded-back portion 14 of the upper rail 6.

Figure 5:
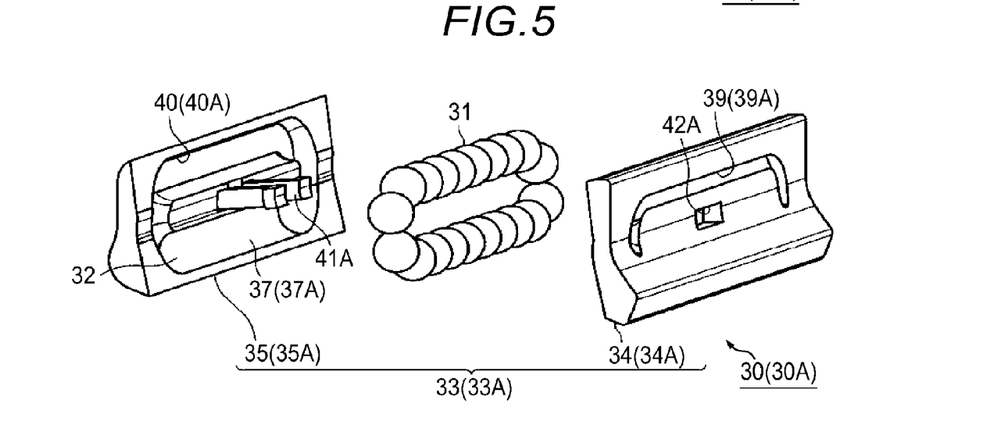
FIG. 5 is an exploded perspective view of the upper rolling element circulation unit.
Figure 6:
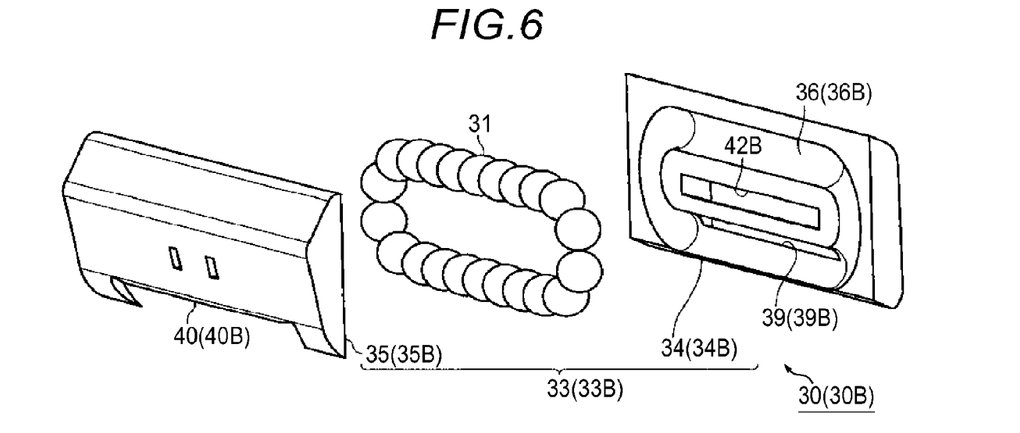
FIG. 6 is an exploded perspective view of a lower rolling element circulation unit.
Figure 9A:
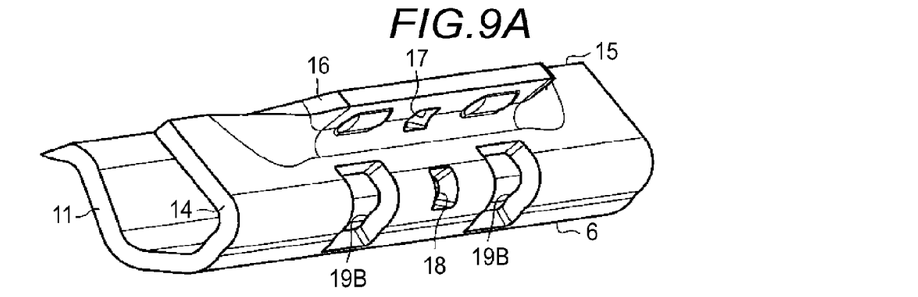
FIG. 9A is a perspective view of a pedestal portion.

Specifically, as illustrated in FIGS. 3, 5, and 9A, in the present exemplary embodiment, the upper rail 6 includes an engagement hole 17 which penetrates the pedestal portion 16 in a thickness direction. In addition, the case 33A of the upper rolling element circulation unit 30A is provided with a claw portion 41A having a bifurcated external shape. Further, the upper rolling element circulation unit 30A is configured such that the base portion 34A is fixed to the pedestal portion 16 as the claw portion 41A is engaged with the engagement hole 17.

In the case 33A in the present exemplary embodiment, the claw portion 41A is provided on the cover portion 35A. Further, the claw portion 41A is configured to be engaged with the engagement hole 17 protruding toward the pedestal portion 16 side through an insertion hole 42A provided in the base portion 34A.

Figure 7:
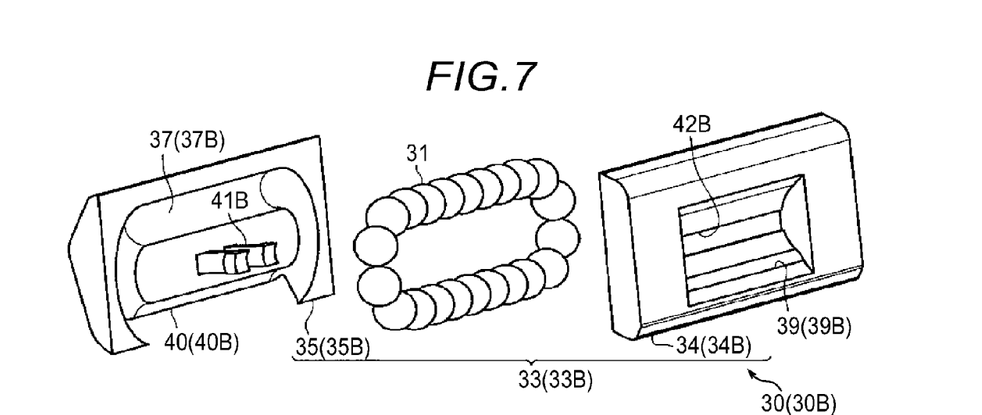
FIG. 7 is an exploded perspective view of the lower rolling element circulation unit.

In addition, as illustrated in FIGS. 3, 7, and 9A, in the present exemplary embodiment, the upper rail 6 includes engagement holes 18, which penetrate the folded-back portions 14, at positions below the engagement holes 17. In addition, the case 33B, which constitutes the lower rolling element circulation unit 30B, includes a claw portion 41B that is substantially identical to the claw portion 41A provided on the case 33A that constitutes the upper rolling element circulation unit 30A. That is, the lower rolling element circulation unit 30B is also configured such that the claw portion 41A is engaged with the engagement hole 18 by protruding toward the pedestal portion 16 side through an insertion hole 42B provided in the base portion 34B. Therefore, the case 33B of the lower rolling element circulation unit 30B is configured such that the opening 40B provided in the cover portion 35B of the case 33B faces the inner wall surface 5a of the lower rail 5.

In addition, the lower rolling element circulation unit 30B is configured such that the opening 39B provided in the base portion 34B faces the folded-back portion 14 of the upper rail 6. Therefore, the opening 39B provided at the base portion 34B side is configured to serve as an upper rail opening for exposing each of the rolling elements 31 accommodated in the annular accommodating path 32 to the outside of the case 33B, and bringing each of the rolling elements 31 into contact with the folded-back portion 14 of the upper rail 6.

As described above, in the rolling element circulation unit 30 (30A or 30B) in the present exemplary embodiment, a contact section 45, which has the openings 39 and 40 that face the inner wall surface 5a of the lower rail 5 and the folded-back portion 14 of the upper rail 6, is formed in the annular accommodating path 32 provided in the case 33 (33A or 33B). In addition, a circulation section 46, which guides the rolling elements 31 passing through the contact section 45 back to the contact section 45 again, is formed in the annular accommodating path 32. In addition, in the seat slide apparatus 51 in the present exemplary embodiment, the lower rolling element circulation unit 30B is fixed to a lower portion having a curve shape formed in the folded-back portion 14 of the upper rail 6, as described above, in a state where a contact section 45B is disposed at a more inner side in the width direction than a circulation section 46B. Further, the upper rolling element circulation unit 30A is configured to be fixed to the pedestal portion 16 provided at an upper portion of the folded-back portion 14 in a state where a contact section 45A is disposed at a more outer side in the width direction than a circulation section 46A.

In the seat slide apparatus 51 in the present exemplary embodiment, the folded-back portion 14 of the upper rail 6 extends upward from the outside to the inside in the rail width direction at a side more upward than a position at which the lower rolling element circulation unit 30B is fixed. That is, at this position, a gap between the folded-back portion 14 of the upper rail 6 and the sidewall portion 8 of the lower rail 5 is increased upward toward the pedestal portion 16. Further, in the present exemplary embodiment, the seat slide apparatus 51 is configured such that the lower rolling element circulation unit 30B is disposed in the gap.

In the upper rail 6 in the present exemplary embodiment, the pedestal portion 16, to which the upper rolling element circulation unit 30A is fixed, extends upward from the inside to the outside in the rail width direction. For this reason, the gap between the pedestal portion 16 provided on the upper rail 6 and the upper wall portion 9 of the lower rail 5 is increased toward the inside in the rail width direction. Further, in the present exemplary embodiment, the seat slide apparatus 51 is configured such that the upper rolling element circulation unit 30A is disposed in the gap.

The seat slide apparatus 51 in the present exemplary embodiment is configured such that the upper rolling element circulation unit 30A is fixed to the pedestal portion 16, and as a result, the rolling elements 31, which are exposed through the opening 40A, are in contact with the upper wall portion 9 (inner wall surface 5a) of the lower rail 5 from the outside to the inside in the rail width direction. Further, the lower rolling element circulation unit 30B is configured such that the rolling elements 31, which are exposed through the opening 40B, are in contact with the sidewall portion 8 (inner wall surface 5a) of the lower rail 5 from the inside to the outside in the rail width direction in a state where the lower rolling element circulation unit 30B is fixed at a position below the folded-back portion 14.

That is, the upper rail 6 is deformed by an applied seat load such that the folded-back portion 14 is lifted upward while being bent inward in a seat width direction with respect to the lower rolling elements 31 which are interposed between the folded-back portion 14 and the lower rail 5 and act as a support point. Further, in the present exemplary embodiment, the seat slide apparatus 51 is configured such that the rolling elements 31 accommodated in the upper rolling element circulation unit 30A are in contact with the upper wall portion 9 of the lower rail 5 in a direction identical to the direction in which the folded-back portion 14 is deformed.

That is, the folded-back portion 14 is deformed based on the seat load, and as a result, the rolling elements 31 accommodated in the upper rolling element circulation unit 30A are pressed against the upper wall portion 9 of the lower rail 5 integrally with the rolling element circulation unit 30A fixed to the tip end portion 15 (pedestal portion 16) of the folded-back portion 14. Therefore, in the present exemplary embodiment, the seat slide apparatus 51 may prevent the formation of the gap between the lower rail 5 and the rolling elements 31 accommodated in the upper rolling element circulation unit 30A.

Figure 9B:
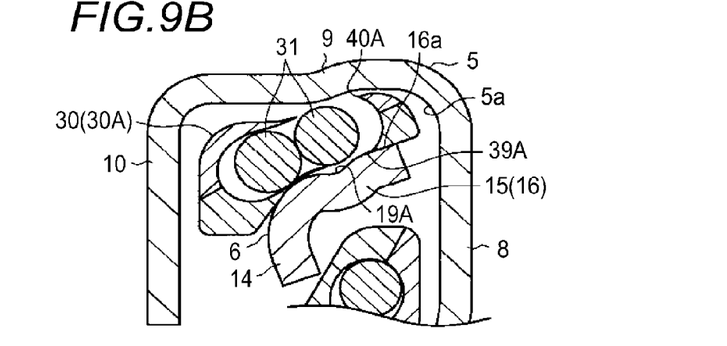
FIG. 9B is an enlarged cross-sectional view of the vicinity of the rolling element circulation unit.

As illustrated in FIGS. 9A and 9B, in the present exemplary embodiment, a pair of groove portions 19A each having a shape digging down a fixing surface 16a are formed in the pedestal portion 16 in the vicinity of the opposite ends of the engagement hole 17 in the longitudinal direction. Further, in the upper rolling element circulation unit 30A fixed to the pedestal portion 16, the opening 39A of the base portion 34A side facing the fixing surface 16a extends up to a position that faces the groove portion 19A (see FIGS. 4 and 5).

A pair of groove portions 19B each having a shape made by cutting off the opposite ends of the engagement hole 18 in the longitudinal direction are formed in the folded-back portion 14 of the upper rail 6 at a position at which the lower rolling element circulation unit 30B is fixed. Further, in the lower rolling element circulation unit 30B, the opening 39B of the base portion 34B facing the folded-back portion 14 extends up to a position that faces the groove portion 19B (see FIGS. 6 and 7).

That is, in the present exemplary embodiment, each of the rolling element circulation units 30 (30A and 30B) is configured such that each of the rolling elements 31 passes over the portions where the groove portions 19A and 19B are formed when each of the rolling elements 31, which are circulated in the annular accommodating path 32, moves from the contact section 45 to the circulation section 46 and moves from the circulation section 46 to the contact section 45. Therefore, in the seat slide apparatus 51 in the present exemplary embodiment, each of the rolling elements 31 is enabled to be smoothly circulated in the annular accommodating path 32 while ensuring the miniaturization of each of the rolling element circulation units 30 (30A and 30B).

(1) The seat slide apparatus 51 includes the rolling element circulation units 30 (30A and 30B) disposed between the inner wall surface 5a of the lower rail 5 and the folded-back portions 14 of the upper rail 6. In addition, the rolling element circulation unit 30 includes the case 33 (33A and 33B) having the annular accommodating path 32, which accommodates the rolling elements 31 such that each of the rolling elements 31 can be circulated, and the openings 39 and 40, which are provided at the annular accommodating path 32. The folded-back portion 14 of the upper rail 6 extends outward in the rail width direction from the lower end of the main body portion 13, and further extends upward to face the sidewall portion 8 of the lower rail 5. In addition, the pedestal portion 16, which extends in the rail width direction to face the upper wall portion 9 of the lower rail 5, is formed at the tip end portion 15 of the folded-back portion 14. Further, the seat slide apparatus 51 is configured such that the upper rolling element circulation unit 30A is fixed to the pedestal portion 16, and as a result, the rolling elements 31, which are exposed through the opening 40A, are in contact with the upper wall portion 9 of the lower rail 5 from the outside to the inside in the rail width direction.

According to the configuration, the pedestal portion 16, which extends in the rail width direction to face the upper wall portion 9 of the lower rail 5, is provided at the tip end portion 15 of the folded-back portion 14 of the upper rail 6, and as a result, the upper rolling element circulation unit 30A may be disposed in the gap between the upper wall portion 9 of the lower rail 5 and the folded-back portion 14 of the upper rail 6. In addition, the rolling elements 31 accommodated in the upper rolling element circulation unit 30A are in contact with the upper wall portion 9 of the lower rail 5 from the outside to the inside in the rail width direction, and as a result, the direction in which the rolling elements 31 are in contact with the upper wall portion 9 of the lower rail 5 may coincide with the direction in which the upper rail 6 is deformed based on a seat load. That is, when a seat load is applied to the upper rail 6, the rolling elements 31 accommodated in the upper rolling element circulation unit 30A are pressed against the upper wall portion 9 of the lower rail 5 integrally with the upper rolling element circulation unit 30A fixed to the pedestal portion 16. Therefore, it is possible to prevent a gap from being formed between the rolling elements 31 and the sidewall portion 8 of the lower rail 5 and between the rolling elements and the folded-back portion 14 of the upper rail 6. As a result, it is possible to more smoothly slide the upper rail 6 relative to the lower rail 5.

(2) The annular accommodating path 32 of the rolling element circulation unit 30 (30A and 30B) has the contact section 45, which has the openings 39 and 40 that face the inner wall surface 5a of the lower rail 5 and the folded-back portion 14 of the upper rail 6, respectively, and the circulation section 46, which guides the rolling elements 31 passing through the contact section 45 back to the contact section 45. Further, in the lower rolling element circulation unit 30B, the contact section 45B is disposed at a more inner side in the rail width direction than the circulation section 46B, and in the upper rolling element circulation unit 30A, the contact section 45A is disposed at a more outer side in the rail width direction than the circulation section 46A.

According to the configuration, it is possible to efficiently dispose the rolling element circulation unit 30 in the gap between the lower rail 5 and the upper rail 6. Therefore, it is possible to suppress a size of the seat slide apparatus 51 from being increased.

(3) In the seat slide apparatus 51, the folded-back portion 14 of the upper rail 6 extends in the rail width direction from the main body portion 13, and then further extends upward from the outside to the inside in the rail width direction. Further, at the tip end portion 15 of the folded-back portion 14, the pedestal portion 16 has a bent shape that extends upward from the inside to the outside in the rail width direction.

The pedestal portion 16, which has the bent shape, is provided at the tip end portion 15 of the folded-back portion 14, and as a result, a space where the lower rolling element circulation unit 30B is disposed may be ensured at a position below the pedestal portion 16. Therefore, it is possible to suppress a size of a cross-sectional shape of the seat slide rail 50 formed by the lower rail 5 and the upper rail 6 from being increased.

(4) The pedestal portions 16 are provided at the tip end portion 15 of the folded-back portion 14 at two front and rear points which are spaced apart from each other in the longitudinal direction of the upper rail 6.

According to the configuration, it is possible to dispose the upper rolling element circulation unit 30A between the lower rail 5 and the upper rail 6 in a balanced manner. Further, the upper rail 6 has modified cross sections, and as a result, it is possible to make the seat slide rail 50 light in weight.

(5) The cases 33 (33A and 33B) of the rolling element circulation units 30 (30A and 30B) have the claw portions 41A and 41B having a bifurcated external shape, respectively. Further, the rolling element circulation units 30 (30A and 30B) are configured such that the claw portions 41A and 41B are engaged with the engagement holes 17 provided in the pedestal portion 16 of the upper rail 6 and the engagement hole 18 provided in the folded-back portion 14, respectively.

According to the configuration, with a simple configuration, the rolling element circulation unit 30 may be easily fixed to the upper rail 6. Therefore, it is possible to achieve efficiency of an assembling operation.

(6) The rolling element circulation unit 30 (30A and 30B) is configured such that the opening 39 (39A or 39B) provided in the base portion 34 (34A and 34B), which constitutes the case 33 (33A, 33B), faces the folded-back portion 14 of the upper rail 6.

According to the configuration, the rolling elements 31 accommodated in the rolling element circulation unit 30 are interposed to be sandwiched between the inner wall surface 5a of the lower rail 5 and the folded-back portion 14 of the upper rail 6. Therefore, it is possible to ensure high support rigidity. In addition, the case 33 does not require high strength, and as a result, it is possible to use, for example, a resin material. Therefore, it is possible to reduce the weight of the rolling element circulation unit 30.

The exemplary embodiment may be changed as follows.
In the exemplary embodiment, at the tip end portion 15 of the folded-back portion 14, the pedestal portion 16 has a bent shape that extends upward from the inside to the outside in the rail width direction.

Figure 10:
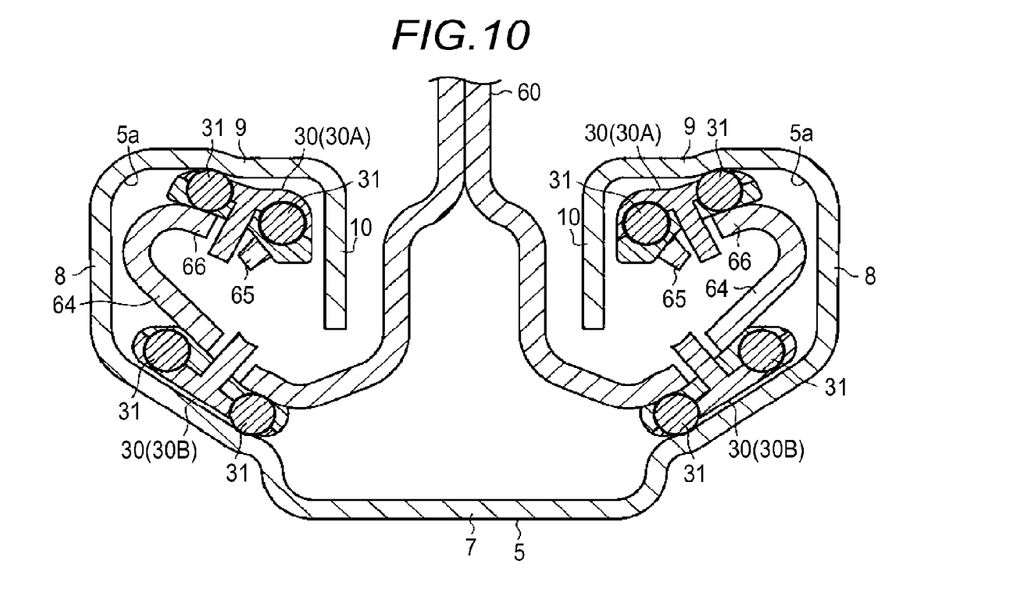
FIG. 10 is a cross-sectional view of a lower rail, an upper rail, and a rolling element circulation unit according to another example.

However, the exemplary embodiment is not limited thereto, and for example, like an upper rail 60 illustrated in FIG. 10, a folded-back portion 64 is configured such that the folded-back portion 64 extends upward from the inside to the outside in the rail width direction, and then a tip end portion 65 of the folded-back portion 64 extends downward from the outside to the inside in the rail width direction to face the upper wall portion 9 of the lower rail 5. Further, the tip end portion 65 may be configured as a pedestal portion 66 to which the upper rolling element circulation unit 30A is fixed.

Even with this configuration, as in the exemplary embodiment, the folded-back portion 64 of the upper rail 60, which is deformed to be lifted upward while being bent inward in the rail width direction when a seat load is applied to the upper rail 60, presses the rolling elements 31, which are accommodated in the upper rolling element circulation unit 30A, against the upper wall portion 9 of the lower rail 5. Therefore, it is possible to prevent a gap from being formed between the rolling elements 31 and the sidewall portion 8 of the lower rail 5 and between the rolling elements and the folded-back portion 64 of the upper rail 60. As a result, it is possible to make the upper rail 60 more smoothly slide relative to the lower rail 5.

In the exemplary embodiment, the pedestal portions 16 are provided at two front and rear points which are spaced apart from each other in the longitudinal direction of the upper rail 6, but the pedestal portions 16 may be provided at three or more points. Further, the tip end portion 15 may be configured to be usable as the pedestal portion 16 over the entire area in the longitudinal direction of the upper rail 6.

In the exemplary embodiment, the case 33 of the rolling element circulation unit 30 has the opening 40 facing the inner wall surface 5a of the lower rail 5, and the opening 39 facing the folded-back portion 14 of the upper rail 6, but the opening 39 at the upper rail 6 side is not necessarily formed. Further, the configuration of the case 33, such as a shape or a material, may be changed arbitrarily.

It is preferable that a seat slide apparatus for a vehicle according to an aspect of this disclosure includes: a lower rail which is fixed to a vehicle floor; an upper rail which is slidably engaged with the lower rail; and a rolling element circulation unit having a plurality of rolling elements and interposed between the lower rail and the upper rail in a state where the plurality of rolling elements is able to be circulated, in which the lower rail includes a bottom wall portion which is fixed to the vehicle floor, sidewall portions which extend upward from opposite ends of the bottom wall portion in a width direction of the lower rail and the upper rail, and upper wall portions which are folded back inward in the width direction from the sidewall portions, the upper rail includes a main body portion which supports a seat for the vehicle at an upper side thereof, and folded-back portions which extend outward in the width direction from a lower end of the main body portion and extend upward to face the sidewall portions of the lower rail, the rolling element circulation unit includes a case having an annular accommodating path that accommodates the rolling elements, the rolling element circulation unit is configured such that when the case is fixed to the folded-back portion of the upper rail, the rolling elements, each of which is exposed to the outside of the case through an opening that are provided at the annular accommodating path, come into contact with an inner wall surface of the lower rail, between the lower rail and the upper rail, an upper rolling element circulation unit and a lower rolling element circulation unit are provided to be disposed at two positions spaced apart from each other in a vertical direction, the upper rail includes a pedestal portion that is provided at a tip end portion of the folded-back portion of the upper rail to extend in the width direction to face the upper wall portion of the lower rail, and the upper rolling element circulation unit is configured such that the rolling elements, which are exposed through the opening as the case is fixed to the pedestal portion, are in contact with the upper wall portion of the lower rail from the outside to the inside in the width direction.

According to this configuration, by providing the pedestal portion at the tip end portion of the folded-back portion of the upper rail to extend in the rail width direction to face the upper wall portion of the lower rail, the upper rolling element circulation unit may be disposed in a gap between the upper wall portion of the lower rail and the folded-back portion of the upper rail. In addition, by causing the rolling elements accommodated in the upper rolling element circulation unit to be in contact with the upper wall portion of the lower rail from the outside toward the inside in the rail width direction, the direction in which the rolling elements are in contact with the upper wall portion of the lower rail may be made to coincide with the direction in which the upper rail is deformed based on a seat load. That is, when a seat load is applied to the upper rail, the rolling elements accommodated in the upper rolling element circulation unit are pressed against the upper wall portion of the lower rail integrally with the upper rolling element circulation unit fixed to the pedestal portion. Therefore, it is possible to prevent a gap from being formed between the rolling elements and the sidewall portion of the lower rail and between the rolling elements and the folded-back portion of the upper rail. As a result, it is possible to make the upper rail more smoothly slide relative to the lower rail.

In the seat slide apparatus for a vehicle according to the aspect of this disclosure, it is preferable that the annular accommodating path includes a contact section which has a first opening facing the inner wall surface of the lower rail, and a circulation section which guides the rolling elements passing through the contact section back to the contact section, the contact section of the lower rolling element circulation unit is disposed at a more inner side in the width direction than the circulation section, and the contact section of the upper rolling element circulation unit is disposed at a more outer side in the width direction than the circulation section.

According to this configuration, the rolling element circulation unit can be efficiently disposed in the gap between the lower rail and the upper rail. Therefore, it is possible to prevent the seat slide apparatus from being enlarged.

In the seat slide apparatus for a vehicle according to the aspect of this disclosure, it is preferable that the folded-back portion extends outward in the width direction from the main body portion, and then further extends upward from the outside to the inside in the width direction, and the pedestal portion has a bent shape that extends upward from the inside to the outside in the width direction at the tip end portion of the folded-back portion.

By providing the pedestal portion having the bent shape at the tip end portion of the folded-back portion, it is possible to secure a space where the lower rolling element circulation unit is disposed, at a position below the pedestal portion. Therefore, it is also possible to suppress the enlargement of a cross-sectional shape of a seat slide rail formed by the lower rail and the upper rail.

In the seat slide apparatus for a vehicle according to the aspect of this disclosure, it is preferable that a plurality of the pedestal portions are provided at a plurality of points which are spaced apart from each other in a longitudinal direction of the upper rail at the tip end portion of the folded-back portion.

According to this configuration, it is possible to dispose the upper rolling element circulation unit between the lower rail and the upper rail in a balanced manner. Further, by making the upper rail have a modified cross section, it is possible to reduce the weight of the seat slide apparatus.

In the seat slide apparatus for a vehicle according to the aspect of this disclosure, it is preferable that a claw portion is formed on the case to be engaged with an engagement hole formed in the upper rail.

According to this configuration, with a simple configuration, the rolling element circulation unit may be easily fixed to the upper rail. Therefore, it is possible to achieve efficiency of an assembling operation.

In the seat slide apparatus for a vehicle according to the aspect of this disclosure, it is preferable that the case includes a second opening through which the rolling elements accommodated in the annular accommodating path are exposed to the outside of the case such that the rolling elements are in contact with the folded-back portion.

According to this configuration, the rolling elements accommodated in the rolling element circulation unit are interposed in a state of being sandwiched between the inner wall surface of the lower rail and the folded-back portion of the upper rail. Therefore, it is possible to ensure high support rigidity. In addition, since the case does not require high strength, it is possible to use, for example, a resin material. Therefore, it is possible to reduce the weight of the rolling element circulation unit.

According to the aspect of this disclosure, the upper rail may more smoothly slide relative to the lower rail.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat slide apparatus for a vehicle, the seat slide apparatus comprising:
   a lower rail which is fixed to a vehicle floor;
   an upper rail which is slidably engaged with the lower rail; and
   a rolling element circulation unit having a plurality of rolling elements and interposed between the lower rail and the upper rail in a state where the plurality of rolling elements is configured to be circulated,
   wherein the lower rail includes a bottom wall portion which is fixed to the vehicle floor, sidewall portions which extend upward from opposite ends of the bottom wall portion in a width direction of the lower rail and the upper rail, and upper wall portions which are folded back inward in the width direction from the sidewall portions,
   the upper rail includes a main body portion which supports a seat for the vehicle at an upper side thereof, and folded-back portions which extend outward in the width direction from a lower end of the main body portion and extend upward to face the sidewall portions of the lower rail,
   the rolling element circulation unit includes a case having an annular accommodating path that accommodates the rolling elements, the rolling element circulation unit is configured such that when the case is fixed to the folded-back portion of the upper rail, the rolling elements, each of which is exposed to the outside of the case through an opening that are provided at the annular accommodating path, come into contact with an inner wall surface of the lower rail, between the lower rail and the upper rail, an upper rolling element circulation unit and a lower rolling element circulation unit are provided to be disposed at two positions spaced apart from each other in a vertical direction, the upper rail includes a pedestal portion that is provided at a tip end portion of the folded-back portion of the upper rail to extend in the width direction to face the upper wall portion of the lower rail, and the upper rolling element circulation unit is configured such that the rolling elements, which are exposed through the opening as the case is fixed to the pedestal portion, are in contact with the upper wall portion of the lower rail from the outside to the inside in the width direction.

2. The seat slide apparatus according to claim 1, wherein the annular accommodating path includes a contact section which has a first opening facing the inner wall surface of the lower rail, and a circulation section which guides the rolling elements passing through the contact section back to the contact section, the contact section of the lower rolling element circulation unit is disposed at a more inner side in the width direction than the circulation section, and the contact section of the upper rolling element circulation unit is disposed at a more outer side in the width direction than the circulation section.

3. The seat slide apparatus according to claim 1, wherein the folded-back portion extends outward in the width direction from the main body portion, and then further extends upward from the outside to the inside in the width direction, and the pedestal portion has a bent shape that extends upward from the inside to the outside in the width direction at the tip end portion of the folded-back portion.

4. The seat slide apparatus according to claim 3, wherein a plurality of the pedestal portions are provided at a plurality of points which are spaced apart from each other in a longitudinal direction of the upper rail at the tip end portion of the folded-back portion.

5. The seat slide apparatus according to claim 1, wherein a claw portion is formed on the case to be engaged with an engagement hole formed in the upper rail.

6. The seat slide apparatus according to claim 1, wherein the case includes a second opening through which the rolling elements accommodated in the annular accommodating path are exposed to the outside of the case such that the rolling elements are in contact with the folded-back portion.

* * * * *